US012689043B2

(12) United States Patent
Lai et al.

(10) Patent No.: US 12,689,043 B2
(45) Date of Patent: Jul. 21, 2026

(54) BATTERY CELL

(71) Applicant: INDUSTRIAL TECHNOLOGY RESEARCH INSTITUTE, Hsinchu (TW)

(72) Inventors: Chien-Ming Lai, Zhubei City (TW); Sung-Chun Chang, Hsinchu City (TW); Chiu-Ping Huang, Kaohsiung City (TW); Li-Duan Tsai, Hsinchu City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 674 days.

(21) Appl. No.: 18/122,643

(22) Filed: Mar. 16, 2023

(65) Prior Publication Data

US 2024/0162455 A1     May 16, 2024

Related U.S. Application Data

(60) Provisional application No. 63/425,188, filed on Nov. 14, 2022.

(30) Foreign Application Priority Data

Nov. 30, 2022    (TW) .................................. 111145953

(51) Int. Cl.
H01M 8/04007       (2016.01)
H01M 8/0245        (2016.01)
H01M 8/0271        (2016.01)
H01M 8/1004        (2016.01)

(52) U.S. Cl.
CPC ..... *H01M 8/04007* (2013.01); *H01M 8/0245* (2013.01); *H01M 8/0271* (2013.01); *H01M 8/1004* (2013.01)

(58) Field of Classification Search
CPC ........... H01M 8/04007; H01M 8/0245; H01M 8/0271; H01M 8/1004
See application file for complete search history.

(56) References Cited

U.S. PATENT DOCUMENTS

| | | | |
|---|---|---|---|
| 8,546,046 B2 | 10/2013 | Wang et al. | |
| 9,515,325 B2 * | 12/2016 | Hsieh ................. | H01M 8/0204 |
| 9,640,806 B2 | 5/2017 | Hsieh et al. | |
| 10,038,203 B2 | 7/2018 | Gurney et al. | |
| 2002/0187379 A1 * | 12/2002 | Yasuo ................. | C23C 14/5853 429/509 |
| 2003/0198857 A1 | 10/2003 | McManus et al. | |
| 2006/0194095 A1 * | 8/2006 | Vyas ................... | H01M 8/0228 429/514 |
| 2018/0205118 A1 * | 7/2018 | Chu .................... | H01M 50/434 |
| 2018/0316038 A1 | 11/2018 | Merzougui et al. | |
| 2018/0323447 A1 * | 11/2018 | Imamura ................. | C23C 28/04 |
| 2019/0173103 A1 * | 6/2019 | Liu ..................... | H01M 8/0258 |
| 2019/0302513 A1 * | 10/2019 | Ide .................... | G02F 1/133615 |
| 2022/0271302 A1 * | 8/2022 | Chang ................. | H01M 8/0202 |
| 2023/0135791 A1 * | 5/2023 | Yun ....................... | H01M 4/137 429/209 |

FOREIGN PATENT DOCUMENTS

| | | |
|---|---|---|
| CN | 102130341 A | 7/2011 |
| CN | 107681176 A | 2/2018 |
| CN | 108963294 B | 6/2021 |
| CN | 113540486 A | 10/2021 |
| CN | 113707901 A | 11/2021 |
| TW | I375347 B1 | 10/2012 |
| TW | 201409814 A | 3/2014 |
| TW | I482349 B | 4/2015 |
| TW | I659562 B | 5/2019 |

OTHER PUBLICATIONS

TW Office Action dated Jun. 24, 2024 as received in Application No. 111145953.

* cited by examiner

*Primary Examiner* — Muhammad S Siddiquee
(74) *Attorney, Agent, or Firm* — Maschoff Brennan

(57)     ABSTRACT

A battery cell including a membrane electrode assembly, a cathode bipolar plate and an anode bipolar plate. The anode bipolar plate includes a metal layer and a thermally conductive layer. The metal layer is stacked on a side of the membrane electrode assembly that is located farthest away from the cathode bipolar plate. The metal layer has a bottom surface, a top surface, a first side surface and a second side surface. The bottom surface faces the membrane electrode assembly. The thermally conductive layer includes a first cover layer and two second cover layers. The first cover layer covers the top surface of the metal layer. The two second cover layers protrude from two opposite sides of the first cover layer, respectively. The two second cover layers at least partially cover the first side surface and the second side surface of the metal layer, respectively.

13 Claims, 5 Drawing Sheets

200

100a

100a

100a

100b

100b

100b

BATTERY CELL

CROSS-REFERENCE TO RELATED APPLICATIONS

This non-provisional application claims priority under 35 U.S.C. § 119(a) on Patent Application No(s). 111145953 filed in Taiwan, R.O.C. on Nov. 30, 2022, and on provisional patent application No. 63/425,188 filed in U.S.A. on Nov. 14, 2022, the entire contents of which are hereby incorporated by reference.

TECHNICAL FIELD

The disclosure relates to a battery cell, more particularly to a battery cell whose anode bipolar plate includes a thermally conductive layer.

BACKGROUND

In general, a fuel cell includes an anode bipolar plate, a membrane electrode assembly and a cathode bipolar plate sequentially stacked along a vertical direction. In order to dissipate the heat generated by the fuel cell during the operation thereof, a plurality of heat dissipation openings are usually formed on a side of the cathode bipolar plate that is located farthest away from the membrane electrode assembly, so as to allow a cool airflow to flow through the heat dissipation openings and dissipate the heat accumulated on the fuel cell.

SUMMARY

One embodiment of this disclosure provides a battery cell including a membrane electrode assembly, a cathode bipolar plate and an anode bipolar plate. The cathode bipolar plate is stacked on a side of the membrane electrode assembly. The anode bipolar plate includes a metal layer and a thermally conductive layer. The metal layer is stacked on a side of the membrane electrode assembly that is located farthest away from the cathode bipolar plate. The metal layer has a bottom surface, a top surface, a first side surface and a second side surface. The bottom surface and the top surface face away from each other. The first side surface and the second side surface face away from each other. The first side surface and the second side surface connect the bottom surface and the top surface and are located between the bottom surface and the top surface. The bottom surface faces the membrane electrode assembly. The thermally conductive layer includes a first cover layer and two second cover layers. The first cover layer covers the top surface of the metal layer. The two second cover layers protrude from two opposite sides of the first cover layer, respectively. The two second cover layers at least partially cover the first side surface and the second side surface of the metal layer, respectively.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
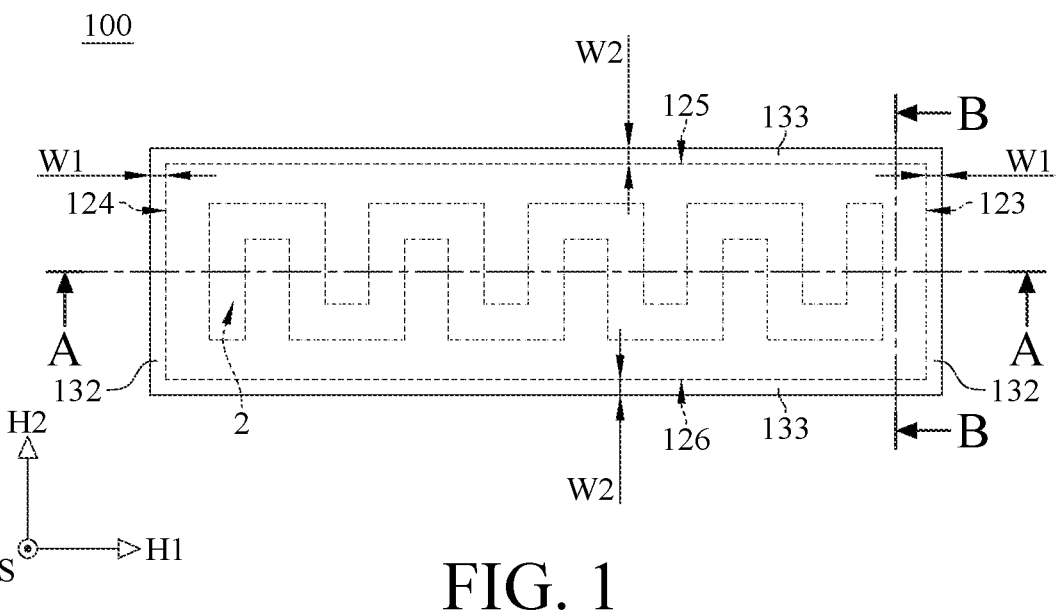
FIG. 1 is a top view of a battery cell according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
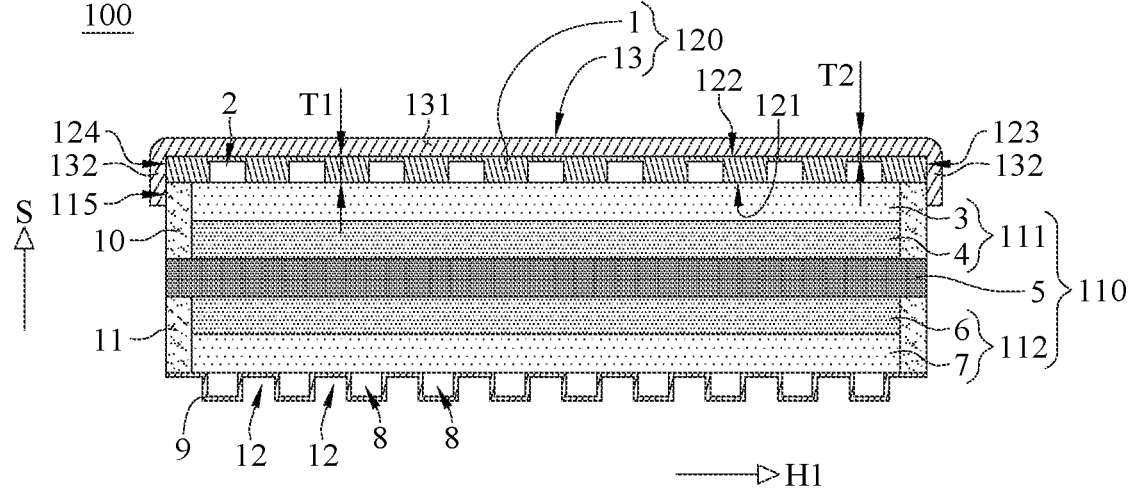
FIG. 2 is a cross-sectional view of the battery cell in FIG. 1 taken along a line A-A.
Figure 3:
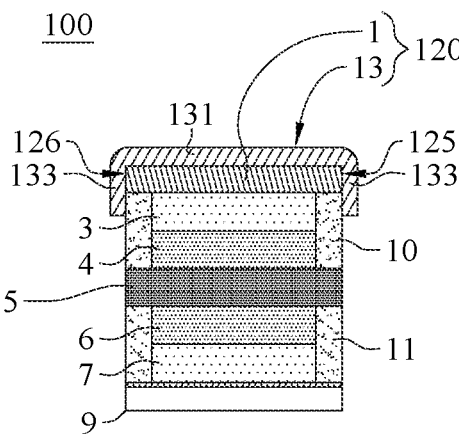
FIG. 3 is a cross-sectional view of the battery cell in FIG. 1 taken along a line B-B.

Please refer to FIGS. 1-3. FIG. 1 is a top view of a battery cell 100 according to a first embodiment of the disclosure. FIG. 2 is a cross-sectional view of the battery cell 100 in FIG. 1 taken along a line A-A. FIG. 3 is a cross-sectional view of the battery cell in FIG. 1 taken along a line B-B.

In this embodiment, the battery cell 100 is, for example, a direct air-cooled fuel cell. In this embodiment, the battery cell 100 includes a membrane electrode assembly 110, a cathode bipolar plate 9, an anode bipolar plate 120, a first sealing member 10 and a second sealing member 11. The cathode bipolar plate 9 and the anode bipolar plate 120 are stacked on two opposite sides of the membrane electrode assembly 110, respectively. That is, the membrane electrode assembly 110, the cathode bipolar plate 9, and the anode bipolar plate 120 are stacked along a stacking direction S.

In this embodiment, the membrane electrode assembly 110 includes an anode side structure 111, a cathode side structure 112 and an ion exchange membrane 5. The anode side structure 111 includes an anode gas diffusion layer 3 and an anode electrode layer 4. The cathode side structure 112 includes a cathode gas diffusion layer 7 and a cathode electrode layer 6. The anode electrode layer 4 and the cathode electrode layer 6 are stacked on two opposite sides of the ion exchange membrane 5, respectively. The anode gas diffusion layer 3 is stacked on a side of the anode electrode layer 4 that is located farthest away from the ion exchange membrane 5. The cathode gas diffusion layer 7 is stacked on a side of the cathode electrode layer 6 that is located farthest away from the ion exchange membrane 5.

The cathode bipolar plate 9 is stacked on a side of the cathode gas diffusion layer 7 that is located farthest away from the cathode electrode layer 6. A plurality of heat dissipation flow channels 12 are formed on a side of the cathode bipolar plate 9 that is located farthest away from the cathode gas diffusion layer 7. Further, a plurality of cathode reaction flow channel 8 are formed on a side of the cathode bipolar plate 9 that is located closest to the cathode gas diffusion layer 7.

The anode bipolar plate 120 includes a metal layer 1 and a thermally conductive layer 13. The metal layer 1 is made of, for example, a metal material such as stainless steel, aluminum, aluminum alloy, titanium, and titanium alloy. The metal layer 1 is stacked on a side of the membrane electrode assembly 110 that is located farthest away from the cathode bipolar plate 9. Specifically, the metal layer 1 is stacked on a side of the anode gas diffusion layer 3 that is located farthest away from the anode electrode layer 4. The metal layer 1 has a bottom surface 121, a top surface 122, a first side surface 123, a second side surface 124, a third side surface 125, a fourth side surface 126 and an anode reaction flow channel 2. The bottom surface 121 faces the anode gas diffusion layer 3. The bottom surface 121 and the top surface 122 face away from each other. The first side surface 123 and the second side surface 124 face away from each other. The first side surface 123 and the second side surface 124 connect the bottom surface 121 and the top surface 122, and are located between the bottom surface 121 and the top surface 122. The third side surface 125 and the fourth side surface 126 connect the first side surface 123 and the second side surface 124, and are located between the first side surface 123 and the second side surface 124. The anode reaction flow channel 2 is spaced apart from the top surface 122, the first side surface 123, the second side surface 124, the third side surface 125 and the fourth side surface 126.

In this embodiment, the thermally conductive layer 13 is, for example, electrically conductive and does not contain impregnation resins. Further, a thermal conductivity of the thermally conductive layer 13 is, for example, higher than a thermal conductivity of the metal layer 1. In this embodiment, the added thermally conductive layer 13 is made of, for example, a natural graphite or a synthetic graphite that is lightweight, electrically conductive, thermally conductive, and corrosion-resistant; in another embodiment, the thermally conductive layer 13 is, for example, ductile, flexible or pliable. Thus, in this embodiment, the thermally conductive layer 13 that is electrically conductive, thermally conductive, and corrosion-resistant can be added while increasing a negligible amount of weight on the battery cell 100, thereby maintaining the battery cell 100 to be lightweight. Thus, the lightweight of the battery cell 100 is facilitated.

Please refer to FIGS. 1-3 again. In this embodiment, the thermally conductive layer 13 includes a first cover layer 131, two second cover layers 132 and two third cover layers 133. The first cover layer 131 covers the top surface 122 of the metal layer 1. As shown in FIGS. 1 and 2, the two second cover layers 132 protrude from two opposite sides of the first cover layer 131, respectively. Two second cover layers 132 at least partially cover the first side surface 123 and the second side surface 124 of the metal layer 1, respectively. In detail, in this embodiment, two second cover layers 132, for example, entirely cover the first side surface 123 and the second side surface 124 of the metal layer 1, respectively. Two third cover layers 133 are located between the two second cover layers 132, and protrude from two opposite sides of the first cover layer 131, respectively. As shown in FIGS. 1 and 3, the two third cover layers 133 at least partially cover the third side surface 125 and the fourth side surface 126 of the metal layer 1, respectively. In detail, in this embodiment, the two third cover layers 133, for example, entirely cover the third side surface 125 and the fourth side surface 126 of the metal layer 1, respectively.

Since the thermally conductive layer 13 covers the metal layer 1, the thermally conductive layer 13 is allowed to efficiently transfer the heat among the top surface 122, the first side surface 123, the second side surface 124, the third side surface 125, and the fourth side surface 126 of the metal layer 1. In this way, the heat can be efficiently transferred along a first horizontal direction H1 and a second horizontal direction H2 that are perpendicular to the stacking direction S of the battery cell 100, and the battery cell 100 is prevented from being locally overheated.

Since the second cover layers 132 and the third cover layers 133 cover the metal layer 1, when multiple battery cells 100 are stacked to each other, the thermally conductive layer 13 is prevented from being moved relative to the metal layer 1 and is in tight contact with the metal layer 1. Accordingly, the heat transfer efficiency between the thermally conductive layer 13 and the metal layer 1 is ensured, thereby ensuring the thermally conductive layer 13 to effectively transfer the heat along the first horizontal direction H1 and the second horizontal direction H2.

In addition, in this embodiment, in the stacking direction S, a thickness T1 of the metal layer 1 is, for example, smaller than or equal to twice of a thickness T2 of the thermally conductive layer 13. Note that the thickness T2 of the thermally conductive layer 13 denotes a thickness of the first cover layer 131 along the stacking direction S, a thickness of each second cover layer 132 along the first horizontal direction H1 or a thickness of each third cover layer 133 along the second horizontal direction H2. In this embodiment, the thickness T2 of the thermally conductive layer 13 ranges, for example, from 25 micrometers ($\mu$m) to 75 $\mu$m. For example, in some embodiments, the thickness T1 of the metal layer 1 is, for example, 50 $\mu$m, and the thickness T2 of the thermally conductive layer 13 is, for example, 75 $\mu$m or 25 $\mu$m. Further, for example, the two second cover layers 132 protrude from the first side surface 123 and the second side surface 124 by a width W1 of 0.25 millimeters (mm), respectively; the two third cover layers 133 protrude from the third side surface 125 and the fourth side surface 126 by a width W2 of 0.25 mm, respectively.

In this embodiment, the thermally conductive layer 13 is attached to the metal layer 1 via, for example, mechanical pressing. In addition, before the thermally conductive layer 13 is attached to the metal layer 1 via mechanical pressing, the thickness of the thermally conductive layer 13 that is not compressed is, for example, equal to the thickness of the metal layer 1.

The first sealing member 10 surrounds the anode side structure 111, and is located between the metal layer 1 and the ion exchange membrane 5. The first sealing member 10 has a side surface 115 facing away from the anode side structure 111. The two second cover layers 132 and the two third cover layers 133 at least partially cover the side surface 115 of the first sealing member 10, so as to allow the thermally conductive layer 13 to be firmly attached to the metal layer 1, thereby ensuring the heat transfer efficiency for the thermally conductive layer 13. The second sealing member 11 surrounds the cathode side structure 112, and is located between the cathode bipolar plate 9 and the ion exchange membrane 5.

Figure 4:
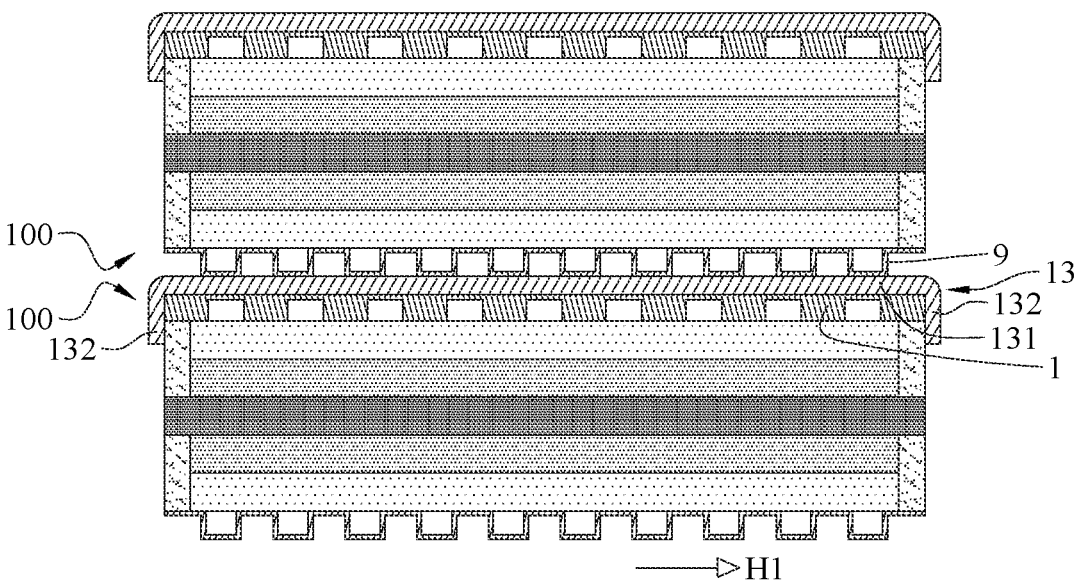
FIG. 4 is a cross-sectional view of a stack according a second embodiment of the disclosure.

Please refer to FIG. 4. FIG. 4 is a cross-sectional view of a stack 200 according a second embodiment of the disclosure. The disclosure further provides a stack 200. The stack 200 includes two battery cells 100 according to the first embodiment. The two battery cells 100 are stacked on each other. Specifically, the cathode bipolar plate 9 of one of the two battery cells 100 is stacked on the first cover layer 131 of the thermally conductive layer 13 included in the other one battery cell 100. Since the second cover layers 132 cover the metal layer 1, when the two battery cells 100 are stacked to form the stack 200, the thermally conductive layer 13 is prevented from being pushed by the cathode bipolar plate 9, and thus is prevented from being moved relative to the metal layer 1. Accordingly, the tight contact between the thermally conductive layer 13 and the metal layer 1 is maintained. In this way, the heat transfer efficiency between the thermally conductive layer 13 and the metal layer 1 is ensured, thereby ensuring the thermally conductive layer 13 to effectively transfer the heat along the first horizontal direction H1.

Note that throughout the specification and the drawings, the same reference number denotes the same or similar component or element.

Figure 5:
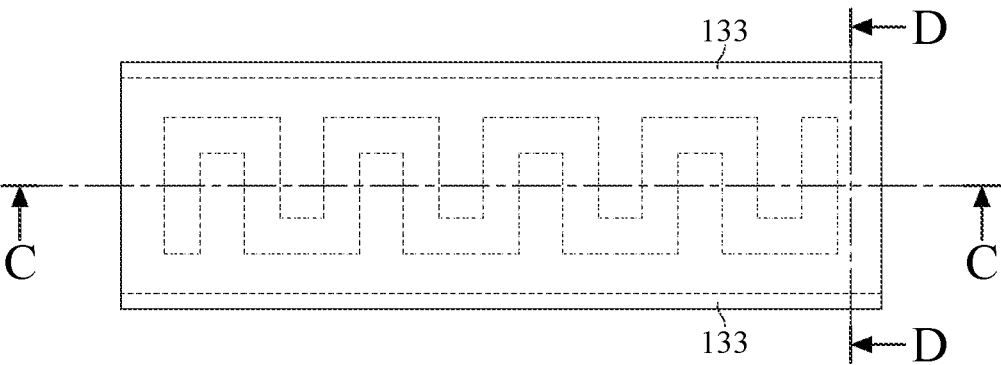
FIG. 5 is a top view of a battery cell according to a third embodiment of the disclosure.
Figure 6:
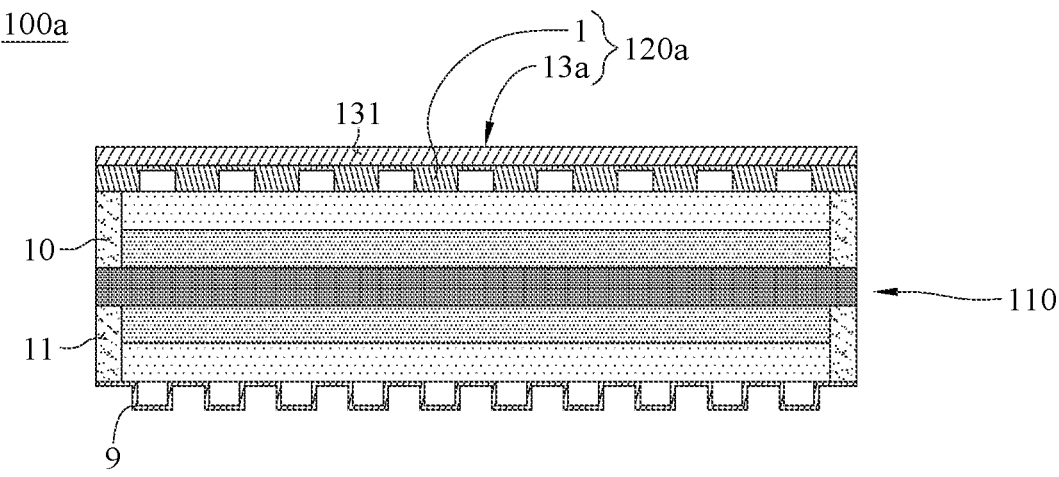
FIG. 6 is a cross-sectional view of the battery cell in FIG. 5 taken along a line C-C.
Figure 7:
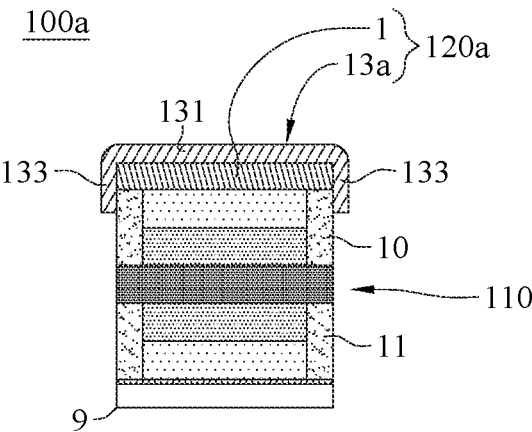
FIG. 7 is a cross-sectional view of the battery cell in FIG. 5 taken along a line D-D.

The thermally conductive layer according to this disclosure is not limited to include two second cover layers and two third cover layers. Please refer to FIGS. 5-7. FIG. 5 is a top view of a battery cell 100a according to a third embodiment of the disclosure. FIG. 6 is a cross-sectional view of the battery cell 100a in FIG. 5 taken along a line C-C. FIG. 7 is a cross-sectional view of the battery cell 100a in FIG. 5 taken along a line D-D. In this embodiment, the battery cell 100a includes a membrane electrode assembly 110, a cathode bipolar plate 9, an anode bipolar plate 120a, a first sealing member 10 and a second sealing member 11. Note that only the difference between the battery cell 100a of this embodiment and the battery cell 100 of the first embodiment will be described hereinafter. In this embodiment, a thermally conductive layer 13a of the anode bipolar plate 120a does not include the two second cover layers 132 in the first embodiment. That is, in this embodiment, the thermally conductive layer 13a include a first cover layer 131 and two third cover layers 133, but does not include the two second cover layers 132 in the first embodiment.

Figure 8:
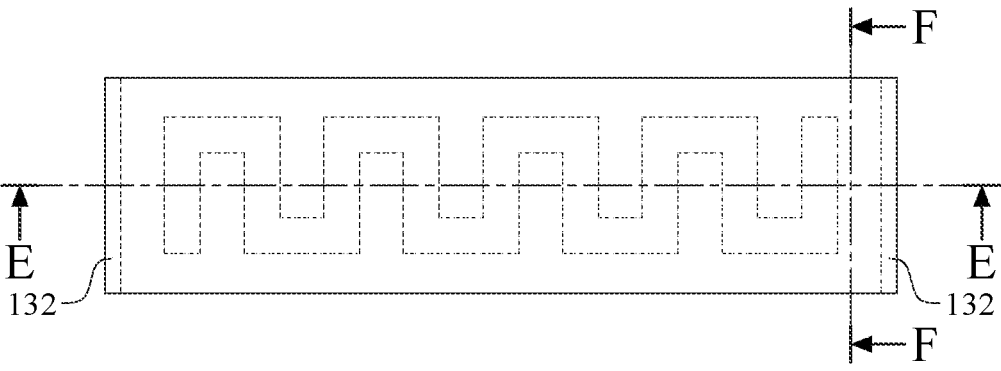
FIG. 8 is a top view of a battery cell according to a fourth embodiment of the disclosure.
Figure 9:
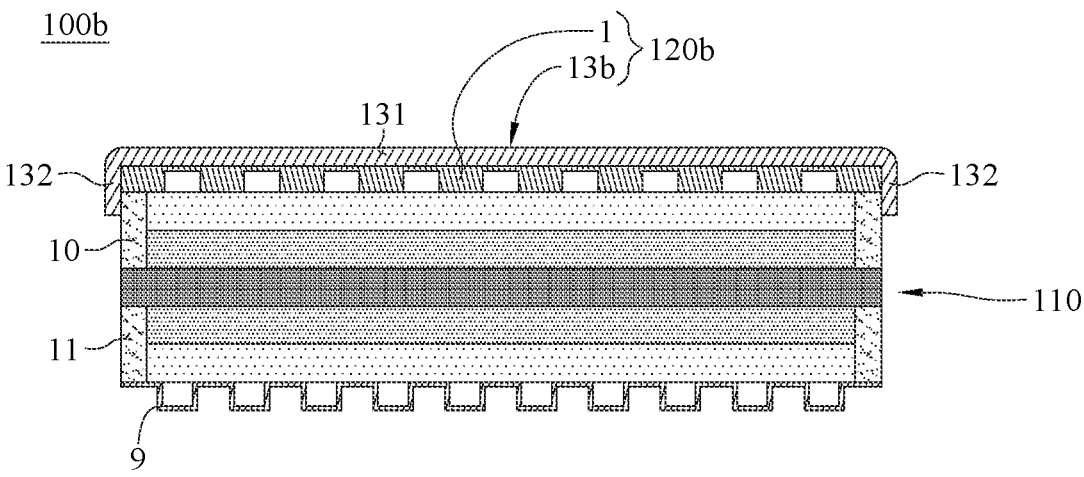
FIG. 9 is a cross-sectional view of the battery cell in FIG. 8 taken along line a E-E.
Figure 10:
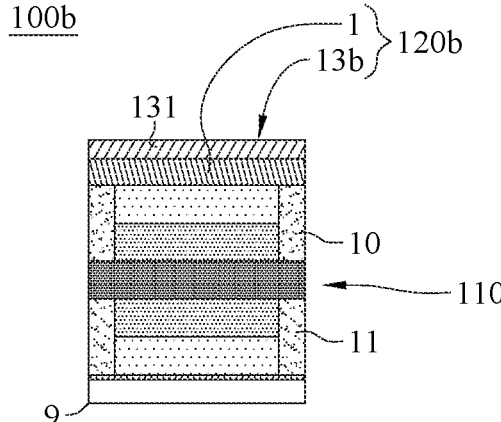
FIG. 10 is a cross-sectional view of the battery cell in FIG. 8 taken along line a F-F.

Alternatively, please refer to FIGS. 8-10. FIG. 8 is a top view of a battery cell 100b according to a fourth embodiment of the disclosure. FIG. 9 is a cross-sectional view of the battery cell 100b in FIG. 8 taken along a line E-E. FIG. 10 is a cross-sectional view of the battery cell 100b in FIG. 8 taken along a line F-F. In this embodiment, the battery cell 100b includes a membrane electrode assembly 110, a cathode bipolar plate 9, an anode bipolar plate 120b, a first sealing member 10 and a second sealing member 11. Note that only the difference between the battery cell 100b of this embodiment and the battery cell 100 of the first embodiment will be described hereinafter. In this embodiment, a thermally conductive layer 13b of the anode bipolar plate 120b does not include the two third cover layers 133 in the first embodiment. That is, in this embodiment, the thermally conductive layer 13b includes a first cover layer 131 and two second cover layers 132, but does not include the two third cover layers 133 in the first embodiment.

Figure 11:
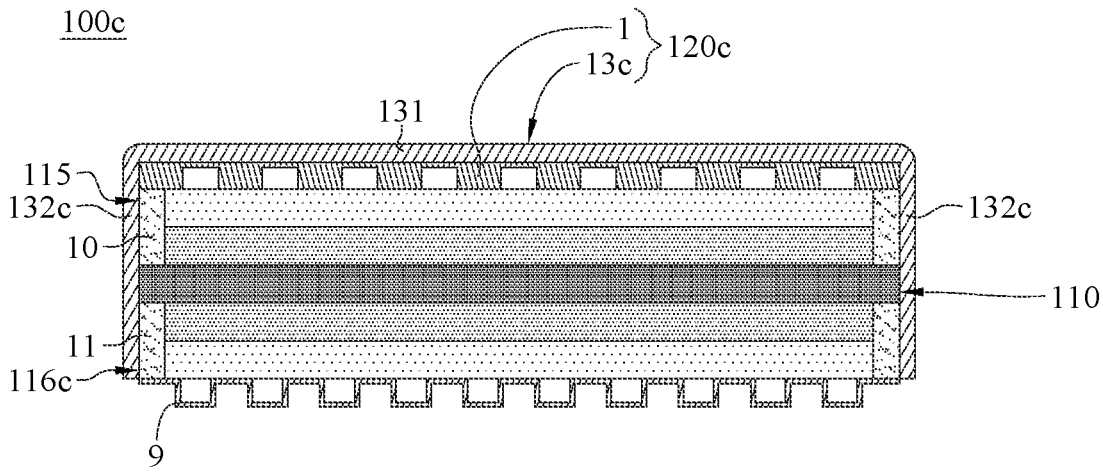
FIG. 11 is a cross-sectional view of a battery cell according to a fifth embodiment of the disclosure.

The disclosure is not limited to the coverage of each second cover layer. Please refer to FIG. 11. FIG. 11 is a cross-sectional view of a battery cell 100c according to a fifth embodiment of the disclosure. In this embodiment, the battery cell 100c includes a membrane electrode assembly 110, a cathode bipolar plate 9, an anode bipolar plate 120c, a first sealing member 10 and a second sealing member 11. The only difference between the battery cell 100c of this embodiment and the battery cell 100 of the first embodiment is the coverage of each second cover layer 132c of a thermally conductive layer 13c included in the anode bipolar plate 120c. In detail, in this embodiment, a side surface 116c of the second sealing member 11 faces away from the cathode side structure 112. The two second cover layers

132c entirely cover the side surface 115 of the first sealing member 10 and the side surface 116c of the second sealing member 11.

Figure 12:
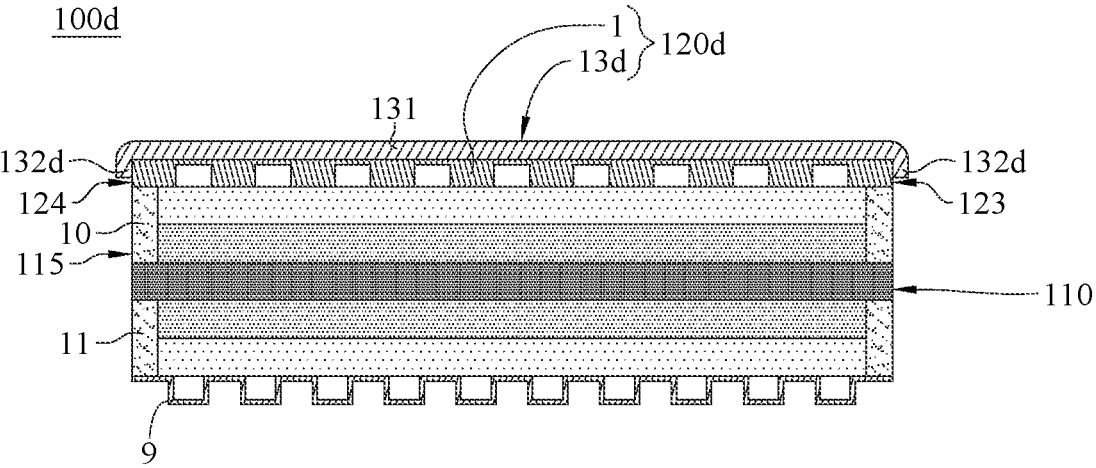
FIG. 12 is a cross-sectional view of a battery cell according to a sixth embodiment of the disclosure.

Alternatively, please refer to FIG. 12. FIG. 12 is a cross-sectional view of a battery cell 100d according to a sixth embodiment of the disclosure. In this embodiment, the battery cell 100d includes a membrane electrode assembly 110, a cathode bipolar plate 9, an anode bipolar plate 120d, a first sealing member 10 and a second sealing member 11. The only difference between the battery cell 100d of this embodiment and the battery cell 100 of the first embodiment is the coverage of each second cover layer 132d of a thermally conductive layer 13d included in the anode bipolar plate 120d. In detail, in this embodiment, two second cover layers 132d do not cover the side surface 115 of the first sealing member 10, and merely partially cover the first side surface 123 and the second side surface 124 of the metal layer 1, respectively.

According to the battery cell disclosed by the above embodiments, the first cover layer of the thermally conductive layer covers the top surface of the metal layer, and the second cover layers of the thermally conductive layer at least partially cover the first side surface and the second side surface of the metal layer, respectively. Thus, the thermally conductive layer is allowed to efficiently transfer heat among the top surface, the first side surface and the second side surface of the metal layer. In this way, the heat can be efficiently transferred along the horizontal direction perpendicular to the stacking direction of the battery cell, and the battery cell is prevented from being locally overheated.

Further, since the second cover layers of the thermally conductive layer at least partially cover the first side surface and the second side surface of the metal layer, respectively, when multiple battery cells are stacked to form a stack, the thermally conductive layer is prevented from being moved relative to the metal layer and is in tight contact with the metal layer. Accordingly, the heat transfer efficiency between the thermally conductive layer and the metal layer is ensured, thereby ensuring the thermally conductive layer to effectively transfer the heat along the horizontal direction.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A battery cell, comprising:
a membrane electrode assembly;
a cathode bipolar plate, stacked on a side of the membrane electrode assembly; and
an anode bipolar plate, comprising a metal layer and a thermally conductive layer, wherein the metal layer is stacked on a side of the membrane electrode assembly that is located farthest away from the cathode bipolar plate, the metal layer has a bottom surface, a top surface, a first side surface and a second side surface, the bottom surface and the top surface face away from each other, the first side surface and the second side surface face away from each other, the first side surface and the second side surface connect the bottom surface and the top surface and are located between the bottom surface and the top surface, the bottom surface faces the membrane electrode assembly, the thermally conductive layer comprises a first cover layer and two second cover layers, the first cover layer covers the top surface of the metal layer, the two second cover layers protrude from two opposite sides of the first cover layer, respectively, and the two second cover layers at least partially cover the first side surface and the second side surface of the metal layer, respectively;

wherein a thermal conductivity of the thermally conductive layer is higher than a thermal conductivity of the metal layer; and wherein the two second cover layers stick out of the membrane electrode assembly along a horizontal direction perpendicular to a stacking direction along which the membrane electrode assembly, the cathode bipolar plate and the anode bipolar plate are stacked.

2. The battery cell according to claim 1, wherein the metal layer further has a third side surface and a fourth side surface facing away from each other, the third side surface and the fourth side surface connect the first side surface and the second side surface and are located between the first side surface and the second side surface, the thermally conductive layer further comprises two third cover layers, the two third cover layers are located between the two second cover layers and protrude from two opposite sides of the first cover layer, respectively, and the two third cover layers at least partially cover the third side surface and the fourth side surface of the metal layer, respectively.

3. The battery cell according to claim 1, wherein the thermally conductive layer is made of a material containing carbon.

4. The battery cell according to claim 3, wherein the thermally conductive layer is made of a natural graphite or a synthetic graphite.

5. The battery cell according to claim 1, wherein the thermally conductive layer is electrically conductive.

6. The battery cell according to claim 1, wherein the two second cover layers entirely cover the first side surface and the second side surface of the metal layer, respectively.

7. The battery cell according to claim 6, wherein the membrane electrode assembly comprises an anode side structure, a cathode side structure and a ion exchange membrane, the ion exchange membrane is located between the anode side structure and the cathode side structure, the cathode bipolar plate is stacked on a side of the cathode side structure that is located farthest away from the ion exchange membrane, and the metal layer is stacked on a side of the anode side structure that is located farthest away from the ion exchange membrane.

8. The battery cell according to claim 7, further comprising a first sealing member and a second sealing member, wherein the first sealing member surrounds the anode side structure and is located between the metal layer and the ion exchange membrane, and the second sealing member surrounds the cathode side structure and is located between the cathode bipolar plate and the ion exchange membrane.

9. The battery cell according to claim 8, wherein the first sealing member has a side surface facing away from the anode side structure, and the two second cover layers at least partially cover the side surface of the first sealing member.

10. The battery cell according to claim 9, wherein the second sealing member has a side surface facing away from the cathode side structure, and the two second cover layers entirely cover the side surface of the first sealing member and the side surface of the second sealing member.

11. The battery cell according to claim 1, wherein a thickness of the metal layer is smaller than or equal to twice of a thickness of the thermally conductive layer.

12. The battery cell according to claim 1, wherein a thickness of the thermally conductive layer ranges from 25 micrometers to 75 micrometers.

13. The battery cell according to claim 1, wherein the thermally conductive layer is attached to the metal layer via mechanical pressing.

* * * * *